United States Patent

Sussman

[15] 3,678,158

[45] July 18, 1972

[54] TREATMENT OF HERNIATED INTERVERTEBRAL DISCS OF MAMMALS

[72] Inventor: Bernard J. Sussman, Washington, D.C.

[73] Assignee: Worthington Biochemical Corporation, Freehold, N.J.

[22] Filed: May 11, 1971

[21] Appl. No.: 142,333

Related U.S. Application Data

[63] Continuation-in-part of Ser. No. 729,436, May 15, 1968, abandoned.

[52] U.S. Cl. .................................................................424/94
[51] Int. Cl. .........................................................A61k 19/00
[58] Field of Search......................................................424/94

[56] References Cited

UNITED STATES PATENTS 3,320,131  5/1967  Smith........................................424/94

OTHER PUBLICATIONS

J. Clin. Invest., 32 1323 (1953)

*Primary Examiner*—Albert T. Meyers
*Assistant Examiner*—Frederick E. Waddell
*Attorney*—Kenyon & Kenyon Reilly Carr & Chapin

[57] ABSTRACT

Herniated intervertebral discs of mammals are treated to effect the selective in situ dissolution in vivo of nucleus pulposus and fibrocartilaginous tissue by the use of a sterile solution of purified collagenase injected into the intervertebral disc space.

2 Claims, No Drawings

TREATMENT OF HERNIATED INTERVERTEBRAL DISCS OF MAMMALS

This application is a continuation-in-part of my application Ser. No. 729,436 filed May 15, 1968, now abandoned.

FIELD OF THE INVENTION

This invention relates to the treatment of herniated intervertebral discs of mammals and relates more especially to treatment whereby herniated intervertebral discs of mammals may be safely treated in vivo to relieve pressure on nerves and nerve roots without resort to surgical removal of the herniated disc.

DESCRIPTION OF THE PRIOR ART

The pain associated with herniation of the intervertebral disc is related to compressive injury of the nerve root occasioned by dislocation of herniated tissue. Persistent symptoms appear to be related to further involvement of the root by chronic inflammation and edema. Rest and various forms of internal or external immobilization achieve their therapeutic effect by preventing further trauma to the root. Steroid therapy is employed for its anti-inflammatory reaction and its reduction of edema. Foramenotomy and disc removal are resorted to for the purpose of effecting nerve root decompression. More generally, those methods of treatment which are successful allow the neural structure a greater amount of room. In order to prevent recurrent pain and safeguard against multiple operative procedures, surgery is resorted to with increasing frequency as a major intervention involving disc removal, foramenotomy and extensive bone fusion. However, such major therapy may fail to relieve symptoms. Moreover, it carries its own inherent risk and it may be unnecessarily destructive of form and function.

Smith et al, Enzyme Dissolution of Nucleus Pulposus, Nature, 198, 1398 (1963), using chymopapain, reported the dissolution of nucleus pulposus in rabbits. In this report and in subsequent papers (Enzyme Dissolution of Nucleus Pulposus in Humans, J.A.M.A., 187, 137–140 (1964) and Treatment of Lumbar Intervertebral Disc Lesions by Direct Injections of Chymopapain, J. of Bone & Joint Surg., Brit., 49-B, 502–519 1967) the authors describe the use of chymopapain in dogs with paraplegia secondary to herniated disc and in human patients with sciatic syndrome. Favorable clinical results were claimed although complications occurred including one case of paraplegia and frequent instances of severe low back pain. Widdowson, Effects of Chymopapain in the Intervertebral Disc of the Dog, J.A.V.M.A., 150, 608–617 (1967), working with chymopapain in dogs, confirmed the favorable effects in the disc space, but injections into the spinal cord, subarachnoid or extradural spaces were attended by hemorrhage, demyelination and satellitosis. In addition, this author reported that these complications, to a varying degree, were constant findings regardless of the site of injection. Shealy, Tissue Reactions to Chymopapain in Cats, J. of Neuro Surg., 26, 327–330 (1967), has further reported that chymopapain has no action specifically on nucleus pulposus and in fact causes severe necrosis wherever it is injected, often producing death by subarachnoid and widespread hemorrhage.

SUMMARY OF THE INVENTION

It is an object of this invention to duplicate the good results which are often obtained by minor operative procedures by the selective dissolution of the herniated nucleus pulposus and annular fibrocartilage. It has been found, according to this invention, that this can be successfully accomplished essentially without injury to adjacent tissues, blood vessels or bone by the use of purified sterile collagenase injected into the intervertebral disc space. As the result of the injection, the nucleus pulposus and the fibrocartilaginous tissue of the disc and annulus, respectively, are selectively dissolved with resultant relief of pressure on the adjoining nerve root.

Collagenase is a rare enzyme found in certain clostridia culture filtrates, and more especially culture filtrates of *Clostridium histolyticum* and *Clostridium welchii*; the former being the preferred source. As initially recovered, collagenase is impure and contains not only collagenase but a peptidase and trypsin-like proteinase. Its recovery in impure form is described by Mandl et al (Isolation and Characterization of Proteinase and Collagenase from *Cl. histolyticum*, J. Clin. Invest., 32, 1323 (1953)). The use of this material has found some application in debridement of third degree burns, in enzymatic separation of dermis and epidermis (Whole Mounts for the Study of Skin and its Appendages, J. Invest. Dermatol., 23, 437–453 (1954)). Collagenase also has been used in studies of different collagens by electron microscopy (Evaluation of Structural and Chemical Changes in Connective Tissue, Annals N.Y. Acad. Sci., 56, 674–683 (1952)). Collagenase may be purified as by chromatography so as to recover an enzyme consisting essentially of collagenase. Moreover, by the employment of conventional techniques to remove bacteria, the collagenase may be produced in sterile form. Collagenase has been purified by electrophoresis of enzyme preparation obtained by ammonium sulfate fractionation and has been the subject of biological investigation by Mandl et al. (Clostridium Histolyticum Collagenase, Its Purification and Properties, Archives of Biochem. and Biophysics, 74, 465–475 (1958)) wherein its activity has been studied as regards its ability to attack collagen and its degradation products and its inability to attack protein substrates such as casein or hemoglobin or the fibrous proteins, fibrin, keratin and elastin.

Denatured collagen is susceptible to many proteolytic enzymes. However, unaltered collagen is resistant to all common proteolytic enzymes. Collagenase when used in accordance with this invention appears to be a unique microbial enzyme as regards its capacity to attack native collagen under physiological conditions of pH and temperature.

Collagen is found in various amounts in the body tissues such as the blood vessels, muscles, etc., and in the case of the material of the disc and of the adjoining fibrocartilaginous material of the annulus it has been found that by the use of a dilute solution of collagenase such as a 0.1 percent solution injected into the disc space into contact with the nucleus pulposus and annulus the collagenase solution will act on the collagen content thereof with resultant substantially complete solution of the nucleus pulposus and solution of the major part of the fibrocartilaginous material of the annulus. The adjoining tissues such as blood vessels and muscles also contain collagen; but in said adjoining tissues the proportion of collagen relative to other tissue material that is not solubilized by collagenase is greater, and it has been determined in practicing this invention that the enzyme exerts little physiological or chemical effect on said adjoining tissues and that there is virtually no damage to them as regards their integrity or their physiological functioning in the living mammal. Similarly, the enzyme does not have any apparent adverse effect on the adjoining bone.

For physiological usage in accordance with this invention, the enzyme can be recovered in the form of a purified stable solution thereof which is subjected to lyophilization to produce it in dry powder form. The dry powder is stable almost indefinitely. At room temperature a 0.1 percent solution is stable for 24 hours. Its stability is related to the concentration of the enzyme, pH and the type of buffer which is used with it. Activity is optimal at a pH of 6.4 but there is a range of activity between 6.2 and 7.8. Moreover, its zone of maximum activity is affected by the nature of any buffer that may be employed. When injected into the body of a mammal, the natural buffers of the body tend to maintain a pH of about 7.4 and when, and even though, the pH of the enzyme may differ from this pH the body buffers tend to bring the pH of an injected solution to a pH of approximately that of the body. As aforesaid, the activity of collagenase is high at the pH and temperature of the body. However, usually it is desirable to bring the pH of the solution that is injected to a pH adjacent that of the body by the use of some buffer such as a phosphate buffer or the conventional physiological saline solution, namely, an 0.85 percent solution of sodium chloride which has a pH of about 7. While ordinarily the activity of the enzyme does not have to be inhibited after injection, nevertheless its activity can readily be inhibited by the employment of cysteine, low pH, $10^{-2}$ M p-chloromercuric benzoic acid, $10^{-2}$ M iodo acetic acid and various horse antisera.

In carrying out the invention, a purified and stable solution of collagenase, preferably about a 0.1 percent solution buffered to approximately 7 pH, is injected directly into the disc space so as to come into direct contact with the nucleus pulposus and surrounding annulus. The amount of solution depends on the size of the disc space. In the case of a medium sized dog, for example, approximately 0.5 to 1.0 cc. usually is sufficient, whereas in the case of a human the disc space is such size that the injection may be of the order of about 3 to 5 cc. After the injection has been completed no further treatment is required other than such further observations as ordinarily are made in the nature of X-ray examination, pulse, temperature, urinalysis, etc.

DETAILED DESCRIPTION AND EXAMPLES

For the purpose of providing a better understanding of this invention, it will be described hereinbelow in connection with the following examples:

EXAMPLE 1

The method of this invention was utilized to effect selective solution of the nucleus pulposus and fibrocartilaginous material of the disc and annulus in the spine of living dogs. This invention was successfully demonstrated in connection with ten dogs in the following manner.

Each dog was first anaesthesized utilizing an intravenously administered short-acting barbiturate. Incursion was effected through the lower abdomen in nine cases and the paravertebral musculature in one case so as to afford operative retroperitoneal exposure and permit injection into the lumbar intervertebral disc space. In order to experimentally determine the safety of the treatment, the injection needle was advanced sufficiently so as to extend not only through the disc space but also just beyond and into the spinal canal but without penetrating the dura. 2 cc. of a 0.1 percent aqueous solution of purified, sterile collagenase solution were injected. Approximately 1 cc. of the solution remained in the disc space. The remaining cc. of solution was discharged into the spinal canal although there was some leakage through the needle opening upon withdrawal of the needle. The treatment was effected in this way so as to fully test the absence of adverse side effects on adjacent muscles, bone, blood vessels and more especially as regards possible contact with the dura. In ordinary practice the injection would be carried out so as to confine as much as possible of the injected solution in the disc space.

For a period of 7 to 10 days following the injection each of the dogs remained fully ambulatory. Blood count, urinalysis, temperature and pulse all remained within normal limits. Moreover, there were no detectable neurological effects. After 7 to 10 days nine of the dogs and, after 2 days, one dog, were sacrificed and an X-ray of the treated portion of the spine was compared with a corresponding X-ray made prior to the injection. Moreover, the affected section of the vertebral column including adjoining vertebra was removed and cut in half so as to make the affected region available for sectioning and photographic and microscopic study. In each case it was observed that the nucleus pulposus and a major portion of the fibrocartilaginous material of the annulus were completely absent and that there had been no significant attack on the hyaline cartilage, the anterior or posterior ligaments, the adjacent bone or the dura.

EXAMPLE 2

Two dogs were subjected to lumbar laminectomy wherein 2 cc. of a sterile 0.1 percent solution of purified collagenase were injected into the extradural space. In the case of two additional dogs, 2 cc. of the same solution were injected intradurally. The two dogs which received the injection extradurally were observed for 2 days. One of the dogs which received the injection intradurally was observed for 2 days and the other for one week. In none of the dogs was there any evidence of spinal cord injury. The dogs remained fully ambulatory with no weakness in the hind legs. There likewise was no evidence of incontinence. The purpose of these tests was to demonstrate that even under extreme conditions of accidental injection extradurally or even intradurally, the selective action of the purified collagenase is such that there is no apparent injury to the spinal cord.

EXAMPLE 3

During laminectomy on a living human patient material was removed from the disc space which responded to tests and microscopic examination identifying it as nucleus pulposus or annulus fibrosis with some admixture thereof. About ⅓ gram of the removed material consisting substantially entirely of nucleus pulposus was placed in 1 cc. of a 0.1 percent solution of purified collagenase in sterile aqueous solution. A like quantity consisting essentially of fibrocartilage was placed in a corresponding quantity of the 0.1 percent collagenase solution. Simultaneously a corresponding quantity of a small artery and of bone, respectively, was placed in a corresponding quantity of the 0.1 percent collagenase solution in other vials. After 18 hours there was essentially complete dissolution of the nucleus pulposus and of the fibrocartilage whereas there was no detectable effect on either the artery or the bone. This example demonstrates the capacity of the collagenase to dissolve the nucleus pulposus and most of the fibrocartilage without detectable effect on adjacent blood vessels or bone.

EXAMPLE 4

Adjacent vertebra halves with a disc therebetween were removed from a human cadaver and subjected to dissection into component parts for enzymatic attack on material in the disc space. Under these conditions it is difficult to distinguish grossly between nucleus pulposus and degenerated fibrocartilage (annulus fibrosis). Nevertheless, in a separate test tube about ⅓ gram of nucleus pulposus, fibrocartilage, hyaline cartilage and anterior ligament, respectively, was immersed in 1 cc. of a 0.1 percent solution of purified collagenase. After 18 hours, dissolution of the nucleus pulposus and fibrocartilage was complete. Under similar conditions of contact with the 0.1 percent solution of collagenase the specimen of hyaline cartilage and the specimen of anterior ligament were not appreciably attacked.

EXAMPLE 5

A disc specimen which had been obtained from a human cadaver and which was essentially similar to that described in example 4 was divided into five approximately equal parts. Each part was blotted with gauze and transferred to a sterile pre-weighed test tube. The tubes were reweighed thereby to obtain the weight of the sample and to each tube different relative amounts were added of a 0.1 percent solution of purified, sterile collagenase and of sterile 0.85 percent sodium chloride so as to achieve a range of four different concentrations of collagenase while maintaining the volume of added solution constant at 2.0 ml. The tubes were placed in a water bath at 37°C. After seven hours the samples to which the collagenase solution had been added began to visually reveal the beginning stages of solubilization. At the end of 24 hours the solubilization observable as determined by visual inspection was substantial. The contents of each of the tubes was poured through gauze and the residues were blotted with gauze to the approximate state of moisture in the initial samples. The tubes were weighed and the percentage solubilization was determined. The data for the test samples and the test results are set forth in the following table:

TABLE I

| Sample | ml 0.1% Collagenase | ml 0.85% NaCl | % Collagenase | Initial Weight (gm.) | Final Weight (gm.) | % Solubilized |
|---|---|---|---|---|---|---|
| a | 0.2 | 1.8 | 0.010 | 1.137 | 0.938 | 17.5 |
| b | 0.5 | 1.5 | 0.025 | 1.028 | 0.636 | 38.2 |
| c | 1.0 | 1.0 | 0.050 | 0.692 | 0.323 | 58.3 |
| d | 2.0 | 0 | 0.100 | 0.769 | 0.205 | 73.4 |
| e | 0 | 2.0 | 0 | 0.933 | 1.046 | — |

The data of the foregoing table show that while the percent solubilization of the material of an unherniated disc obtained from a cadaver progressively decreases at decreasing collagenase concentrations less than 0.1 percent, it is noteworthy that even at 0.01 percent concentration the solubilization obtained is substantial.

EXAMPLE 6

A specimen of an herniated intervertebral disc removed from a living human during surgery was rinsed aseptically twice with sterile 0.85 percent sodium chloride to remove excess blood. The specimen was divided into five approximately equal parts which were treated identically according to the procedure described in example 5 to provide a range of four concentrations of collagenase while maintaining the volume of added solution constant at 2.0 ml. The tubes were placed in a water bath at 37°C. Solubilization was apparent after 2 or 3 hours and was very pronounced after seven hours. After 24 hours the contents of each tube was poured through gauze in an attempt to weigh the residue, as had been done in example 5. However, in each of the tubes containing enzyme solution the solubilization had progressed so far that any slight residue was not palpable and was impossible to weigh. Virtually all of the specimen was solubilized in each of the tubes containing enzyme solution. The data for the test samples and the test results are set forth in the following table:

TABLE II

| Sample | ml 0.1% Collagenase | ml 0.85% NaCl | % Collagenase | Initial Weight (gm) | Final Weight (gm) |
|---|---|---|---|---|---|
| f | 0.2 | 1.8 | 0.010 | 0.405 | Not weighable |
| g | 0.5 | 1.5 | 0.025 | 0.341 | Not weighable |
| h | 1.0 | 1.0 | 0.050 | 0.389 | Not weighable |
| i | 2.0 | 0 | 0.100 | 0.322 | Not weighable |
| j | 0 | 2.0 | 0 | 0.286 | 0.237 |

The increase in solubilization as compared with example 5 reflects the greater collagenase content of the herniated disc used in example 6. The test data show that in the treatment of an herniated disc highly effective solubilization of the disc substance was obtained when employing a solution of the purified collagenase at concentrations of approximately 0.01 percent to approximately 0.1 percent.

The practice of this invention is of utility in connection with veterinarian usage as well as in humans. For example, dogs, particularly of the dachshund breed, are subject to injury with resultant herniation of spinal discs. In the treatment of humans it is contemplated to effect entry into the disc space for injection of the collagenase solution from the back of the patient with the injection needle passing through the dura and spinal fluid, and through the posterior ligament using a technique similar to that which is conventional to a spinal tap for the removal of spinal fluid except that introduction of the needle is carried further into the disc space. Alternatively, so that the needle will not come into proximity with the dura a lateral approach to the disc space may be employed. Whether the collagenase is used for veterinarian purposes or for the treatment of humans, conventional X-ray techniques may be employed for locating the herniated disc.

It is a further aspect of this invention that collagenase is provided in dosage form appropriate for a single intervertebral injection into a living mammal and, to this end, a sterile, purified solution of collagenase is introduced into a vial in sufficient quantity to provide the necessary volume for injection of a solution having a concentration of approximately 0.01 to 0.1 percent. The solution is then subjected to lyophilization to produce the collagenase in dry, sterile condition and the vial is sealed. At the time of use the aqueous medium used for injection is added directly to the vial. As aforesaid, the aqueous solvent may contain a small amount of buffer or saline material to provide the desired pH. The collagenase solution is ready for use as soon as it is prepared in this way.

Known procedures for the purification of the collagenase may be employed such as the procedure described by Keller and Mandl (The Preparation of Purified Collagenase, Arch. of Biochem. and Biophys., 101, 81 (1963)). As a precautionary measure, a test portion of the collagenase that is produced for clinical use should be tested to insure its essential freedom from proteolytic and elastolytic activity. Desirably also it should be checked for its sterility and pyrogenicity. The preferred minimum activity for collagenase is 200 units which may be determined by the assay method of Mandl et al. (Isolation and Characterization of Proteinase and Collagenase from Cl. histolyticum, J. Clin. Invest., 32, 1323 (1953)). The amino acids liberated are expressed as micromoles leucine per milligram collagenase.

I claim:

1. In the treatment of an herniated intervertebral disc wherein there is injected into the disc space a solution of an enzyme which selectively dissolves material comprised in the disc, the improvement which consists essentially of the injection into the disc space of a sterile pharmaceutically acceptable aqueous solution of purified collagenase the concentration of which is from approximately 0.01 percent to approximately 0.1 percent in an amount that is effective to selectively dissolve native collagen contained in the nucleus pulposus and in the adjoining annulus fibrosis, said collagenase being recovered from clostridia culture filtrates selected from the group consisting of *Clostridium histolyticum* and *Clostridium welchii* and being essentially free of proteolytic activity on any protein other than collagen.

2. The method of claim 1 wherein the concentration of the collagenase in the injected solution is approximately 0.1 percent.

* * * * *